United States Patent [19]

Kudo et al.

[11] 4,367,205

[45] Jan. 4, 1983

[54] PROCESS FOR REMOVING SULFUR DIOXIDE FROM COMBUSTION EXHAUST GAS

[75] Inventors: Yoshihiko Kudo; Yukio Suzuki; Mituru Otomo, all of Iwaki, Japan

[73] Assignee: Kureha Kagaku Kogyo Kabushiki Kaisha, Tokyo, Japan

[21] Appl. No.: 291,503

[22] Filed: Aug. 10, 1981

[30] Foreign Application Priority Data

Aug. 19, 1980 [JP] Japan ................................. 55-113789

[51] Int. Cl.$^3$ .............................................. C01B 17/00
[52] U.S. Cl. .................................................... 423/243
[58] Field of Search ............... 423/242 A, 242 R, 243, 423/244 A, 244 R

[56] References Cited

U.S. PATENT DOCUMENTS

| | | | |
|---|---|---|---|
| 3,928,537 | 12/1975 | Saitoh et al. | 423/243 |
| 3,985,860 | 10/1976 | Mandelik et al. | 423/242 |
| 3,987,149 | 10/1976 | Saitoh et al. | 423/243 |
| 4,029,402 | 5/1977 | Kobayashi et al. | 423/243 |
| 4,046,856 | 9/1977 | Itoo et al. | 423/242 |
| 4,080,428 | 3/1978 | Holter et al. | 423/243 |
| 4,213,946 | 7/1980 | Furuta et al. | 423/242 |

FOREIGN PATENT DOCUMENTS 1545175 5/1976 United Kingdom .
1482643 8/1977 United Kingdom .

Primary Examiner—Earl C. Thomas
Assistant Examiner—Gregory A. Heller
Attorney, Agent, or Firm—Cushman, Darby & Cushman

[57] ABSTRACT

The present invention concerns a process for removing sulfur dioxide from a combustion exhaust gas, wherein sulfur dioxide contained in the combustion exhaust gas is absorbed into an aqueous absorbent containing carboxylate salts and after oxidizing the thus formed sulfite and hydrogen sulfite into sulfate, the sulfate is converted into gypsum and separated, the invention particularly concerning a method for suppressing the decomposition of the carboxylate salts at the same time oxidizing the sulfite and hydrogen sulfite.

6 Claims, 1 Drawing Figure

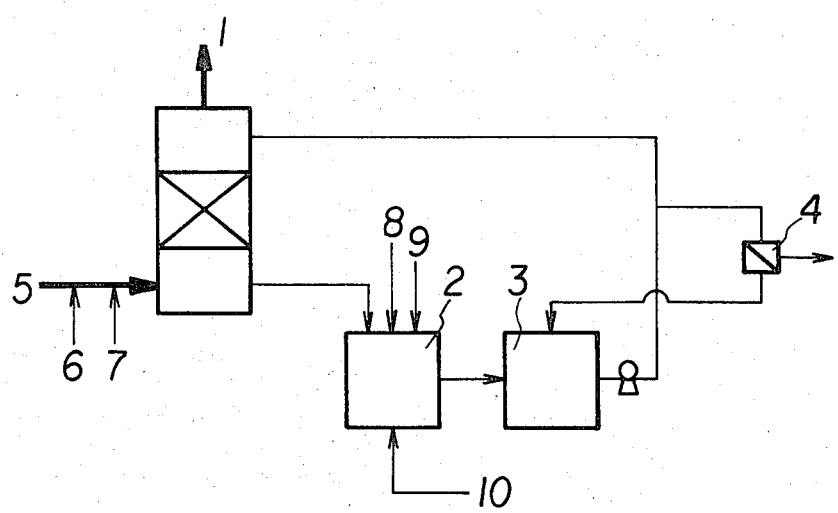

PROCESS FOR REMOVING SULFUR DIOXIDE FROM COMBUSTION EXHAUST GAS

SUMMARY OF THE INVENTION

In a process of removing sulfur dioxide contained in a combustion exhaust gas by contacting the combustion exhaust gas with an aqueous absorbent containing carboxylate salts to absorb sulfur dioxide into the absorbent and after oxidizing the thus formed $SO_3{}^{2-}$ and $HSO_3{}^-$ in the absorbent into sulfate by air, adding slaked lime or limestone to the absorbent thereby by-producing gypsum, the improvement according to the present invention comprising the use of an aqueous solution containing 2 to 10% by weight, preferably 4 to 8% by weight of chloride ion together with the carboxylate salts as the aqueous absorbent for suppressing the induced oxidative decomposition of the carboxylate by air.

BACKGROUND OF THE INVENTION

Hitherto, many processes have been proposed for removing sulfur dioxide from an exhaust gas by using an aqueous solution of an alkali carboxylate as the absorbent for sulfur dioxide. The term "alkali carboxylate" as used herein includes alkaline metal carboxylates, alkali earth metal carboxylates and also ammonium carboxylate.

The reason why such a process has been proposed frequently is thought to be that sodium-, ammonium-, magnesium- and calcium carboxylate are water-soluble and have a favorable buffer capacity in the region of pH of 2 to 7 and accordingly, they act effectively in absorption of gaseous sulfur dioxide.

The processes for removing sulfur dioxide from an exhaust gas using an aqueous solution of an alkali carboxylate are classified as follows according to their by-products: (1) those in which $SO_2$ is recovered, for instance, by using sodium citrate as the alkali carboxylate (refer to U.S. Pat. Nos. 3,970,744 and 2,142,987), (2) those in which elementary sulfur is recovered, for instance, by using sodium citrate (refer to U.S. Pat. Nos. 4,083,944 and 3,933,994) or by using sodium sulfosuccinate (refer to U.S. Pat. No. 2,729,543), (3) those in which calcium sulfite is by-product (refer to Japanese Patent Application Laying-Open No. 55-61923/80) and (4) those in which gypsum is by-product (refer to Japanese Patent Application Laying Open No. 49-104881/74).

However, the above-mentioned processes are disadvantageous due to the gradual consumption of the carboxylate by decomposition during the operation of the process of desulfurization.

For example, in the step wherein $SO_3{}^{2-}$ and $HSO_3{}^-$ which are formed from sulfur dioxide absorbed into the aqueous solution containing the alkali carboxylate are oxidized by oxygen, an active radical is formed as an intermediate reaction product and the radical induces an oxidative decomposition of the carboxylate ion which co-exists with the radical. The amount of carboxylate ion decomposed is nearly proportional to the sum of amounts of $SO_3{}^{2-}$ and $HSO_3{}^-$ which are oxidized by oxygen.

Accordingly, in each of the above-mentioned processes (1), (2) and (3), since oxidation in the absorption tower is carried out only by the oxygen contained in the combustion exhaust gas, only a small part of $SO_3{}^{2-}$ and $HSO_3{}^-$ is oxidized and the amount of oxidatively decomposed carboxylate ion is also small enough so as to render the problem of consumption by decomposition of the carboxylate ion negligible. However, in the process of type (4) wherein sulfur dioxide is recovered as gypsum after forcibly oxidizing the whole amount of absorbed sulfur dioxide, the decomposition and elimination of the carboxylate ion becomes a significant problem which is not negligible.

As a method for suppressing the decomposition of carboxylate ion in the process of absorbing sulfur dioxide contained in the combustion exhaust gas by the use of alkali carboxylate to obtain gypsum as a by-product, a method of having manganese ion or copper ion co-exist with the alkali carboxylate in the aqueous absorbent has been known (refer to Japanese Patent Publication No. 53-42317/78). According to this known method, in the case where divalent manganese ion or copper ion is present at a concentration of 100 ppm, the amount of gaseous carbon dioxide generated by the decomposition of the carboxylate ion is about half when compared to the case where such a metal ion is absent. In the case where divalent manganese ion or copper ion is present at a concentration of 3000 ppm, the amount of gaseous carbon dioxide by the decomposition of carboxylate ion is less than one tenth as compared to the case where no metal ion is present.

However, in the case where the aqueous absorbent is neutral to alkaline, the manganese ion or the copper ion is converted to its hydroxide which is insoluble in the aqueous solution. Thus in order to prevent such a phenomenon, it is necessary to maintain the aqueous absorbent acidic.

On the other hand, in the case where an aqueous solution of an alkali salt of a volatile carboxylic acid is used as the aqueous absorbent, a free carboxylic acid is formed upon the absorption of gaseous sulfur dioxide and a part of the free carboxylic acid thus formed is dissipated with the treated exhaust gas when the pH of the aqueous absorbent which is brought into contact with the exhaust gas is at a low level.

Such a dissipation of carboxylic acid may be prevented by washing the de-sulfurized exhaust gas with an alkaline solution. However, this additional washing of the de-sulfurized exhaust gas makes the process more complicated. Moreover, in the case where an aqueous absorbent at a high pH level is used for preventing the dissipation of the carboxylic acid, manganese ion or copper ion which suppress the decomposition of the carboxylate ion cannot co-exist with the carboxylate ion in the aqueous absorbent.

As has been described, a process for removing sulfur dioxide from a combustion exhaust gas, by which the dissipation of carboxylic acid and also the decomposition of the carboxylate ion are prevented, has not been known.

Since in a process for removing sulfur dioxide from a combustion exhaust gas, which is of the type of by-producing gypsum while using an alkali carboxylate, the amount of the carboxylate ion decomposed is nearly proportional to the sum of amounts of $SO_3{}^{2-}$ and $HSO_3{}^-$ oxidized and also depends on the concentration of the carboxylate ion, the concentration of the alkali carboxylate in the aqueous absorbent is preferably as low as possible within the limit which is necessary for the absorption of gaseous sulfur dioxide. As a result of the inventors' studies on the decomposition of carboxylate ion, it has been found that the decomposition of carboxylate ion depends largely on the concentration of chloride ion in co-existence, and in the case where its concentration is higher than 0.4% by weight, the amount of carboxylate ion decomposed shows reduction and in the case of higher than 2% by weight, the decomposition is remarkably suppressed. The present invention depends on the above-mentioned findings.

BRIEF DESCRIPTION OF THE DRAWING

The sole accompanying drawing schematically illustrates the system utilized in Example 4 which follows.

DETAILED DESCRIPTION OF THE INVENTION

The object of the present invention is to provide a process for removing sulfur dioxide from a combustion exhaust gas, wherein the dissipation by volatilization of free carboxylic acid and the decomposition of the carboxylate ion in the absorbent for sulfur dioxide are effectively suppressed.

The present invention concerns a process for removing sulfur dioxide from the combustion exhaust gas, comprising the steps of bringing an aqueous solution containing magnesium carboxylate as an absorbent into contact with the combustion exhaust gas containing gaseous sulfur dioxide, oxidizing the thus formed $SO_3^{2-}$ and $HSO_3^-$ from the absorbed sulfur dioxide into sulfate by air and subsequently adding slaked lime or limestone into the absorbent to by-produce gypsum, in which process an aqueous solution containing 2 to 10% by weight, preferably 4 to 8% by weight of chloride ion together with magnesium carboxylate is used as the absorbent thereby suppressing the decomposition of the carboxylate ion.

The present invention will be explained more in detail as follows:

Since in a fuel such as heavy petroleum oil and coal, chlorine compound(s) is present even in a minute amount, an exhaust gas, for instance, from a furnace where coal is burned contains 30 to 150 ppm of hydrogen chloride. Besides, chloride ion is contained in industrial water and also in slaked lime or limestone at respective concentrations of ordinary 20 to 50 mg/liter and 40 to 100 mg/kg. As a result, upon the operation of a process for removing sulfur dioxide from a combustion exhaust gas, which the type of by-producer gypsum, chloride ion gradually accumulates in the recycled absorbent. Accordingly, in the ordinary process for removing sulfur dioxide from the combustion exhaust gas, the concentration of chloride ion is controlled to less than 2%, normally less than 1% in the absorbent in order to prevent the corrosion of metallic materials of the apparatus by the chloride ion. The control of the chloride ion concentration is carried out by discharging a part of the absorbent containing chloride ion as the drainage. However, in the case where the concentration of chloride ion in the absorbent is kept at a low level by such a method, unfavorable results are caused by the large amount of the discharged absorbent with the large amount of the discharged carboxylate ion.

As has been described, although the chloride ion which is brought into co-existence within the absorbent in the process of the present invention is supplied by the combustion exhaust gas, industrial water and slaked lime or limestone and attains a predetermined concentration after long term operation. Thus, chlorine ion is supplied in a form of a chloride, preferably magnesium chloride, in the early stage of the operation of the process, corresponding to the degree of necessity. Although the chloride ion further accumulates even after its concentration has attained the predetermined value, the concentration of chloride ion is kept at the predetermined value by removing a part of the absorbent from the system. In this case, since the concentration of chloride ion is high enough to remove a smaller amount of the absorbent as compared to the conventional case wherein the chloride ion is kept at a low level of concentration, the loss of carboxylate ion is also smaller.

Although the effect of preventing the decomposition of carboxylate ion is recognizable in a certain degree even if chloride ion is present at a concentration of about 0.4% by weight, the effect is remarkable at a concentration of 2% by weight. For instance, in an actual process in which 400,000 $Nm^3$/hour of a combustion exhaust gas containing 3000 ppm of sulfur dioxide is treated continuously with the absorbent containing 0.8% by weight of magnesium acetate while by-producing gypsum, the necessary amount of acetic acid for make-up is 150 kg/hour when the concentration of chloride ion in the absorbent is 0.47% by weight. However, a remarkably smaller amount of 64 kg/hour of acetic acid is enough for make-up when the concentration of chloride ion is 2% by weight. This effect becomes more noticeable when the concentration of chloride ion is higher than 4% by weight.

In the case where the concentration of chloride ion is higher than 10% by weight, although it is still effective in suppressing the decomposition of carboxylate ion naturally, the increment of the degree of suppressing the decomposition versus the constant increment of the concentration of chloride ion becomes smaller as the concentration of chloride ion exceeds 10% by weight.

On the other hand, even if the decomposition of carboxylate ion is suppressed at 100%, the make-up of carboxylic acid or a carboxylate salt is inevitable because of the loss of carboxylate ion in other steps. Besides, in cases where the concentration of chloride ion is brought to an excessibly high level, the rate of oxidation of $SO_3^{2-}$ and $HSO_3^-$ becomes remarkably reduced. Owing to the above-mentioned reasons, the concentration of chloride ion in the absorbent is sufficient for the purpose of the present invention at the level lower than 10% by weight.

Monocarboxylic acid such as acetic-, propionic-, butyric-, valeric acid and the like, dicarboxylic acid such as succinic-, glutaric-, adipic acid and the like and sulfocarboxylic acid such as sulfoacetic, sulfopropionic-, sulfosuccinic acid and the like is effective as a carboxylate ion in the present invention. The concentration of the carboxylate ion in the absorbent is preferably as low as possible, that is, lower than 0.4 mol (as monocarboxylate)/kg of absorbent, more preferably at 0.04 to 0.2 mol (as monocarboxylate)/kg.

When the absorbent is brought into contact with the combustion exhaust gas, (1) the concentration of chloride ion, (2) the concentration of carboxylate ion and (3) the pH of the absorbent are respectively set to (1) 2 to 10% by weight, preferably 4 to 8% by weight, (2) lower than 0.4 mol/kg by weight, preferably 0.04 to 0.2 mol/kg and (3) 4 to 8. The more preferable pH in the case of monocarboxylate or dicarboxylate is 7 to 8. The reason of such an adjustment of pH is the prevention of dissipation by volatilization of the freed monocarboxylic acid from monocarboxylate ion, or of the freed monocarboxylic acid from another monocarboxylate ion formed by the decomposition of dicarboxylate ion with the desulfurized exhaust gas. Such a control of pH of the absorbent may be effected by slaked lime used for formation of gypsum.

In the case where an absorbent is used having a pH lower than the above-mentioned range, the exhaust gas which has once treated by the desulfurization process is further washed with an aqueous alkaline solution, that is, a slurry of slaked lime, and the washings may be returned to the process of desulfurization to be used as a part of the absorbent.

On the other hand, since free sulfocarboxylic acid formed from sulfosuccinate is substantially non-volatile and does not form any volatile free acid even if decomposed, the pH of the absorbent containing such sulfocarboxylate ion is preferably 4 to 6. In such a case of using an absorbent of low pH, not only slaked lime but also limestone may be used as a source of calcium for forming gypsum, the method being economically advantageous.

In addition, although magnesium ion which is present in the absorbent as cation is partially lost due to drainage and is also partially lost together with gypsum, since magnesium is contained at 0.1 to 1% by weight in the slaked lime or limestone, it is not necessary to supply magnesium salt as make-up.

As has been described, in the case where an absorbent containing only carboxylate ion which a chloride, preferably magnesium chloride is used, since there may be a chance of calcium sulfite or gypsum deposits in the system which adheres to the apparatus as scale. This is due to the presence of $Ca^{2+}$ dissolved in the absorbent in an amount corresponding to the solubility of gypsum in the case where a solution from which by-produced gypsum has been removed is used in recycle as the absorbent, calcium sulfite separating out and depositing at the part of the system where $SO_3^{2-}$ increases in the absorbent, and gypsum separating out and depositing at the other part of the system where $SO_4^{2-}$ increases in the absorbent. In order to prevent the deposition of calcium sulfite, it is effective to have sulfate ion present in the absorbent at a concentration higher than 0.17 mol/kg. Since the concentration of $Ca^{2+}$ is nearly in reverse proportion to that of $SO_4^{2-}$, the presence of sulfate ion of more than 0.17 mol/kg causes the reduction of the concentration of $Ca^{2+}$ and the separation and deposition of calcium sulfite is prevented even if the concentration of $SO_3^{2-}$ is slightly raised. Moreover, gypsum separates in the case of oxidation of $SO_3^{2-}$ and $HSO_3^-$, and also in the case when slaked lime or limestone is added to the absorbent after oxidation. However, even in these cases, the new separation and deposition of gypsum occur on the crystalline gypsum which has already been added to the absorbent, and accordingly, the formation of scale on the wall of the apparatus by the adhesion of gypsum is prevented.

The desirable composition of the absorbent upon actual operation of the present invention comprises less than 0.4 mol/kg, preferably 0.04 to 0.2 mol/kg of magnesium carboxylate, 2 to 10% by weight, preferably 4 to 8% by weight of chloride ion, 2 to 6% by weight of magnesium sulfate, 3 to 10% by weight of crystalline gypsum, and the balance being water, having a pH of 7 to 8 in the case where the carboxylate is acetate, adipate and the like, or having a pH of 4 to 6 in the case where sulfocarboxylate is sulfosuccinate and the like.

Sulfur dioxide contained in the combustion exhaust gas is collected while using the thus adjusted absorbent in the form of $SO_3^{2-}$ and $HSO_3^-$ therein, and then the absorbent is sent to the oxidation step. The sum of concentrations of $SO_3^{2-}$ and $HSO_3^-$ in the absorbent sent to the oxidation step is preferably lower than 40 to 100 millimol/kg. The solution containing the sulfite ion and hydrogen sulfite ion more than the abovementioned value has a tendency of depositing calcium sulfite within the absorption tower. In addition, the sum of concentrations of $SO_3^{2-}$ and $HSO_3^-$ at the outlet of the oxidation vessel is preferably kept at 2 to 8 millimol/kg. Oxidation of $SO_3^{2-}$ and $HSO_3^-$ contained in the absorbent is carried out by blowing air to form sulfate ion and slaked lime or limestone is subsequently added to the thus oxidized absorbent to form gypsum in an amount corresponding to the amount of absorbed sulfur dioxide. Gypsum is then separated from the absorbent. Since it is necessary to have crystalline gypsum contained in the absorbent in advance of forming gypsum, separation of gypsum is carried out by filtration of a part of the absorbent, and the thus obtained filtrate is mixed with the remaining part of the absorbent still containing gypsum. The mixture is then recycled as the absorbent to be sent to the absorption tower. In addition, oxidation and formation of gypsum may be carried out in one reaction vessel or may be carried out in separate reaction vessels.

The present invention concerns a process in which chloride ion is present at a high concentration, chloride ion having been regarded as an unfavorable factor, and accordingly, ordinary metallic materials cannot be used for construction of the process apparatus. Then it is necessary to use highly expensive corrosion-resistant metallic materials, such as titanium and nickel alloy, which makes the apparatus construction cost highly expensive. However, as has been described in detail, the make-up amount of carboxylic acid is greatly reduced in the long term operation of the process in which the concentration of chloride ion in the absorbent is 2 to 10% by weight, and the greatly reduced amount of carboxylic acid for make-up is more than sufficient in compensating the disadvantage due to the higher construction cost, and remarkably improves the economy of the process.

This invention is to be explained by referring to the following examples in conjunction with the appended drawing, by which the foregoing and other objects, as well as features of this invention will be made more clear.

The appended drawing illustrates the system for experiments in Example 4, in which, 1 is an absorption tower of packed type, 2 is a reaction vessel for oxidation and formation of gypsum, 3 is a storage tank, 4 is a gypsum-separator, 5 is an exhaust gas from a boiler, 6 is sulfur dioxide make-up, 7 is gaseous hydrogen chloride make-up, 8 is carboxylic acid make-up, 9 is feed line of slaked lime and 10 is inlet of air.

The examples show the effects of suppressing the decomposition of carboxylate ion due to the presence of chloride ion at a high concentration in the present invention. Particularly, in Examples 1 and 2, in order to clearly show the decomposition of carboxylate ion, the reactions in an actual process for continuously removing sulfur dioxide were intended to reproduce in experimental scale. In order to reproduce the decomposition of carboxylate ion in a continuous process with a favorable accuracy in a laboratory scale, the reaction conditions in oxidation such as composition of the solution, rate of oxidation, temperature, pH of the solution, etc. should be kept constant for a long term and even a slight diminution of carboxylate ion should be detected. These can be attained by the steps of (1) having calcium sulfite ($CaSO_3 \cdot \frac{1}{2}H_2O$) present as a slurry in a predetermined absorbing liquid, as a source of $SO_3^{2-}$, in a single vessel, (2) oxidizing the calcium sulfite by air to covert to gypsum and (3) determining the amount of carboxylate ion decomposed. For example, the amount of carboxylate ion decomposed is more accurately given in the case where (1) absorption of sulfur dioxide, (2) oxidation by air, (3) addition of calcium hydroxide or calcium carbonate and (4) separation of the thus formed gypsum are carried out in a single vessel than in the case where respective steps (1) to (4) are separately carried out in a small consecutive apparatus.

Moreover, of the reactions carried in a single vessel on a laboratory scale, (1) the dissolution of calcium sulfite corresponds to the absorption of sulfur dioxide in the absorbent and the addition of calcium hydroxide or calcium carbonate thereinto in the continuous process, (2) the oxidation of dissolved $SO_3^{2-}$ and $HSO_3^-$ corresponds to the oxidation step in the continuous process and (3) the separation of gypsum in the solution corresponds to separation and removal of gypsum in the continuous process. During the period of the time of experiment, the water-balance, respective concentrations of various ions in the solution and pH of the solution are respectively kept nearly constant.

EXAMPLE 1

In a 1.2-liter cylindrical reactor provided with a stirrer and an air-inlet tube to the bottom of the reactor, 750 g of a liquid having a composition shown in Table 1 and 250 g of calcium sulfite hemihydrate were placed, and after stirring the content to form slurry, the decarbonated air was blown into the slurry until all the calcium sulfite hemihydrate was completely oxidized into calcium sulfate dihydrate at a constant temperature of 55° C., at a pH in a constant range of 6.7 to 6.8, with a constant rate of decarbonated air flow of 10.3 N liter/hour under a constant stirring of 800 r.p.m. In this experiment, a minute raise of pH of the slurry was recognized with the decomposition of acetate ion, and it was controlled by the addition of sulfuric acid. During this experiment, the concentrations of carbon dioxide and methane contained in the off gas were determined to obtain the total amounts of generated carbon dioxide and methane. The rate of oxidation of $HSO_3^{31} + SO_3^{2-}$ during the reaction under stirring and air flow was nearly 0.1 mol/kg.hour. The thus obtained results of this experiment are shown in Table 1.

As can be seen in Table 1, the amount of acetate ion decomposed is reduced as the concentration of chloride ion is raised, and even at the same concentration of chloride ion, the amount of acetate ion decomposed is larger when the cation is $Na^+$ than when the cation is $Mg^{2+}$. In addition, the respective amounts of carbon dioxide and methane which are formed as the result of decomposition of acetate ion are smaller as the concentration of chloride ion is larger, and accordingly, the amount of carbon dioxide or methane in this case can be used as the index of the amount of acetate ion decomposed.

TABLE 1

| Item | Experiment No. | | | | |
|---|---|---|---|---|---|
| | 1 | 2 | 3 | 4 | 2' |
| Composition of the solution | | | | | Refer to Footnote[1] |
| $(CH_3COO)_2Mg$ (% by weight) | 0.80 | 0.80 | 0.80 | 0.80 | |
| $MgSO_4$ (% by weight) | 2.0 | 2.0 | 2.0 | 2.0 | |
| $MgCl_2$ (% by weight) | 0.63 | 1.36 | 2.70 | 9.01 | |
| (as $Cl^-$) | (0.47) | (1.01) | (2.01) | (6.71) | (1.01) |
| Concentration of ($SO_3^{2-}$ + $HSO_3^-$) dissolved in the solution during Reaction (millimol/kg) | 3–4 | 3–4 | 4–5 | 5–6 | 2–3 |
| Concentration of $(CH_3COO)_2Mg$ in the solution after Reaction (% by weight) | 0.31 | 0.51 | 0.64 | 0.77 | 0.42[2] |
| Molar ratio of generated $CO_2$ to oxidized $SO_3^{2-}$, × 100 | 2.78 | 2.11 | 1.47 | 0.64 | 2.66 |
| Molar ratio of generated $CH_4$ to oxidized $SO_3^{2-}$, × 100 | 1.21 | 0.78 | 0.44 | 0.063 | 1.18 |

Notes:
[1]Composition of the solution in Experiment 2' is as follows: $CH_3COONa$: 0.92% by weight, $Na_2SO_4$: 2.36% by weight and NaCl: 1.66% by weight, The concentrations of anions are the same as in Experiments 2 and 2'.
[2]The concentration of $CH_3COONa$ of 0.48% by weight, calculated as $(CH_3COO)_2Mg$

EXAMPLE 2

The same procedures utilized in Example 1 were carried out on the solution of the composition shown in Table 2 while using the same apparatus as in Example 1, the different conditions from those of Example 1 being as follows:

(1) using sulfosuccinate ion instead of acetate ion
(2) mol concentration of sulfosuccinate ion of half of that of acetate ion and
(3) at a pH of 5.9 to 6.0

In addition, in Example 2, the amount of carboxylate ion decomposed is represented by the amount of generation of carbon dioxode.

The results are shown in Table 2.

TABLE 2

| Item | Experiment No. | |
|---|---|---|
| | 5 | 6 |
| Composition of the solution | | |
| Magnesium sulfosuccinate (% by weight) | 1.30 | 1.30 |
| Magnesium sulfate (% by weight) | 2.0 | 2.0 |
| Magnesium chloride (% by weight) | 0.63 | 9.01 |
| (as chloride ion) (% by weight) | (0.47) | (6.71) |
| Concentration of ($SO_3^{2-}$ + $HSO_3^-$) dissolved in the solution during Reaction (millimol/kg) | 3–4 | 5–6 |
| Molar ratio of generated $CO_2$ to oxidized $SO_3^{2-}$ × 100 | 0.75 | 0.20 |

As can be seen in Table 2, the amount of sulfosuccinate ion decomposed is reduced with the increase of concentration of chloride ion in the solution also in the case where carboxylate is sulfocarboxylate.

EXAMPLE 3

In the same apparatus utilized in Example 1, 1000 g of the solution of the following composition was placed, and air was blown at a rate of 10.3 N liter/hour to the solution at 55° C. and at pH of 6.7 to 6.8 (adjusted by adding sodium hydroxide) under stirring at 400 r.p.m. During the above-mentioned reaction, the amount of gaseous methane was determined as an index of the amount of acetate ion decomposed.

| Composition of the solution: (% by weight) | |
|---|---|
| $(CH_3COO)_2Mg$ | 0.8 |
| $MgSO_4$ | 2.0 |
| $MgCl_2$ | refer to Table 3 |
| $MgSO_3$ | 0.2 |
| Water | balance, | pH of the solution being adjusted to 6.8 by sulfuric acid.

Since there were the cases where the ratio of rate of generation of methane to rate of oxidation of $SO_3^{2-}$ depended on the sum of concentrations of $SO_3^{2-}$ and $HSO_3^-$, such a ratio is shown in Table 3.

As can seen in Table 3, in the cases where cation in the solution was the same kind, the decomposition of acetate ion was suppressed as the concentration of chloride ion was raised, and in the cases where the concentration of chloride ion was the same, the rate of decomposition of acetate ion is larger when cation was $Na^+$ than when cation was $Mg^{2+}$.

TABLE 3

| Experiment No. | Concentration of chloride ion (% by weight) | (Ratio of rate of generation of Methane to rate of oxidation of sulfite ion) × 100 Concentration of $(SO_3^{2-} + HSO_3^-)$ of | |
|---|---|---|---|
| | | 2 | 6 (mmol/kg) |
| 11 | 0.47 | 2.3 | 2.0 |
| 12 | 1.0 | 1.3 | 1.2 |
| 13 | 2.0 | 0.6 | 0.6 |
| 14 | 6.7 | 0.12 | 0.12 |
| 15 | 10 | 0.04 | 0.04 |
| 14' | 6.7 | 0.4 | 0.35 |

Notes:
(1) The pH of the liquid used in Experiments was at first adjusted to 6.8 by adding sulfuric acid to the liquid in advance of the reaction.
(2) In Experiment 14', the concentration of chloride ion was the same as that in Experiment 14, however, cation is $Na^+$ instead of $Mg^{2+}$ in Experiment 14.

EXAMPLE 4

By using an apparatus capable of treating an exhaust gas at a rate of 3500 to 5500 $Nm^3$/hour as shown in FIG. 1, sulfur dioxide was removed from a combustion exhaust gas from a boiler, and the decomposition of carboxylate ion contained in the absorbent was examined. The exhaust gas used in this example was a mixture of a combustion exhaust gas from a heavy oil burning boiler containing 1400 to 1500 ppm of sulfur dioxide and a combustion exhaust gas prepared by burning sulfur to adjust the total concentration of sulfur dioxide shown in Table 4, and its temperature at the inlet of the absorption tower 1 was 150° to 160° C.

The aqueous absorbent for use in the absorption tower 1 stored in the storage tank 3 contained gypsum of a concentration of 3 to 7% by weight in a state of slurry, the pH of the solution being 7.2 to 7.8 when acetate was used in Experiments Nos. 101 to 107, or 5.5 to 5.9 when sulfosuccinate was used in Experiments Nos. 108 and 109 and the pH having been adjusted by changing the flow rate of the slurry of slaked lime introduced in the reaction vessel 2. The concentrations of other salt dissolved in the absorbent were shown in Table 4.

The absorbent which absorbed sulfur dioxide in the absorption tower 1 was sent to the reaction vessel 2 wherein $SO_3^{2-}$ and $HSO_3^-$ in the absorbent are oxidized by air to be $SO_4^{2-}$. The thus formed $SO_4^{2-}$ reacts with slaked lime which has been put into the reaction vessel 2 to be gypsum which separates out within the absorbent. A part of the thus separated gypsum was removed to outside of the system in order to maintain the concentration of slurry.

In order to maintain the concentration of carboxylate ion which was lost by decomposition, etc., a predetermined amount of a carboxylic acid was supplied continuously, namely an aqueous 50% by weight of acetic acid being used to maintain the concentration of $(CH_3COO^- + CH_3COOH)$ at 0.0976 mol/kg (corresponding to 0.69% by weight of magnesium acetate) in Experiments Nos. 101 to 107 or an aqueous 50% by weight of magnesium sulfosuccinate solution being used to maintain the concentration of sulfosuccinate at 0.0488 mol/kg (corresponding to 0.0976 carboxylate equivalent/kg, that corresponds to 1.13% by weight as magnesium sulfosuccinate).

Since a part of chloride ion was lost with gypsum, the constancy of chloride ion concentration was compensated by supplying a flow of gaseous hydrogen chloride at a predetermined rate into the mixture of combustion exhaust gas introduced into the absorption tower 1.

The results of Experiments Nos. 101 to 109 are shown in Table 4.

TABLE 4

| Item | Experiment No. | | | | | | | | |
|---|---|---|---|---|---|---|---|---|---|
| | 101 | 102 | 103 | 104 | 105 | 106 | 107 | 108 | 109 |
| Composition of Absorbent (% by weight) | | | | | | | | | |
| Magnesium acetate | 0.56–0.73 | 0.67–0.75 | 0.65–0.78 | 0.66–0.71 | 0.66–0.75 | 0.69–0.86 | 0.71–0.75 | — | — |
| Magnesium sulfosuccinate | — | — | — | — | — | — | — | 1.02–1.24 | 1.03–1.21 |
| $Cl^-$ (as $MgCl_2$) | 0.37–0.49 | 0.93–0.99 | 0.78–0.98 | 1.7–1.9 | 1.6–1.8 | 5.4–6.3 | 5.5–5.9 | 1.9–2.1 | 5.8–6.2 |
| $MgSO_4$ | 2.0–3.2 | 2.8–4.4 | 4.4–7.1 | 2.6–4.1 | 4.1–4.8 | 3.6–5.4 | 5.4–5.9 | 2.5–6.0 | 2.5–6.8 |
| Amount of treated Gas ($Nm^3$/hour) | 4100–4600 | 3500–4200 | 3900–4300 | 4000–4400 | 4800–5300 | 4000–4200 | 3500–4500 | 4000–4500 | 4100–4200 |
| Concentration of $SO_2$ (ppm) weight base | 2800–3000 | 1500–3000 | 3000–3900 | 3000–3200 | 2800–3000 | 3000–3500 | 2800–2900 | 2500–4000 | 3000–3200 |
| Efficiency of desulfurization | higher than | higher than | higher than | higher than | higher than | higher than | higher than | 97% | 98% |

TABLE 4-continued

| Item | Experiment No. | | | | | | | | |
|---|---|---|---|---|---|---|---|---|---|
| | 101 | 102 | 103 | 104 | 105 | 106 | 107 | 108 | 109 |
| | 99% | 99% | 99% | 99% | 99% | 99% | 99% | | |
| Time of operation (hour) | 88 | 91 | 110 | 105 | 84 | 102 | 86 | 143 | 198 |
| Amount of $SO_2$ absorbed (kmol) | 50.4 | 38.1 | 63.1 | 58.8 | 54.0 | 58.3 | 42.2 | 84.4 | 113.0 |
| Consumed amount of carboxylate[1] ion (kmol) | 3.52 | 1.75 | 2.88 | 1.23 | 1.06 | 0.596 | 0.379 | 0.96 | 0.60 |
| (lost with the treated gas as acid) | 0.09 | 0.08 | 0.10 | 0.11 | 0.10 | 0.052 | 0.047 | — | — |
| (lost with gypsum) | 0.09 | 0.09 | 0.15 | 0.08 | 0.09 | 0.133 | 0.123 | 0.17 | 0.23 |
| (decomposed[2]) | 3.34 | 1.58 | 2.63 | 1.04 | 0.87 | 0.411 | 0.209 | 0.79 | 0.37 |
| Ratio[3] | 6.6 | 4.1 | 4.2 | 1.77 | 1.61 | 0.70 | 0.50 | 0.94 | 0.33 |

Notes:
[1]In the cases of sulfosuccinic acid, the value corresponds to 2 times of sulfosuccinate ion.
[2]The amount of consumption by decomposition was calculated as: (amount consumed) − (lost with the treated gas) − (lost with gypsum).
[3]The ratio of amount of carboxylate ion decomposed to amount of sulfur dioxide absorbed, represented by kmol/kmol × 100.

What is claimed is:

1. In a process for removing sulfur dioxide from a combustion exhaust gas contaning the sulfur dioxide by contacting the combustion exhaust gas with an aqueous absorbent containing carboxylate salts to absorb the sulfur dioxide, thus formed $SO_3^{2-}$ and $HSO_3^-$ by absorbing the sulfur dioxide are oxidized by an oxygen-containing gas to sulfate and subsequently adding slaked lime or limestone to the resultant absorbent thereby forming gypsum, the improvement which comprises contacting said combustion exhaust gas with said aqueous absorbent containing 2 to 10% by weight of chloride ion while being in coexistence with said carboxylate salts thereby suppressing the decomposition of a carboxylate ion.

2. The process according to claim 1, wherein said aqueous absorbent contains 4 to 8% by weight of chloride ion together with said carboxylate ion.

3. The process according to claim 1, wherein said aqueous absorbent containing chloride ion contains magnesium carboxylate, magnesium chloride, magnesium sulfate and crystalline gypsum.

4. The process according to claim 1 or 2, wherein said carboxylate is at least one selected from the group consisting of acetate, propionate, butyrate, valerate, succinate, glutarate, and adipate or at least one selected from the group consisting of sulfoacetate, sulfosuccinate and sulfopropionate.

5. The process according to claim 1 or 2, wherein said carboxylate is monocarboxylate or dicarboxylate and the pH of said aqueous absorbent is adjusted in range of 7 to 8.

6. The process according to claim 1 or 2, wherein said carboxylate is a sulfocarboxylate and the pH of said aqueous absorbent is adjusted in a range of 4 to 6.

* * * * *